March 17, 1953     A. E. D'HARLINGUE     2,632,087
UTILITY BURNER
Filed Sept. 28, 1950
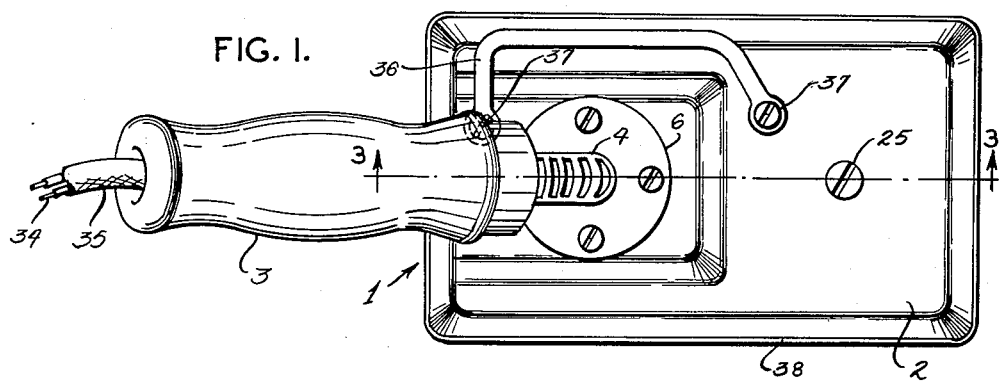
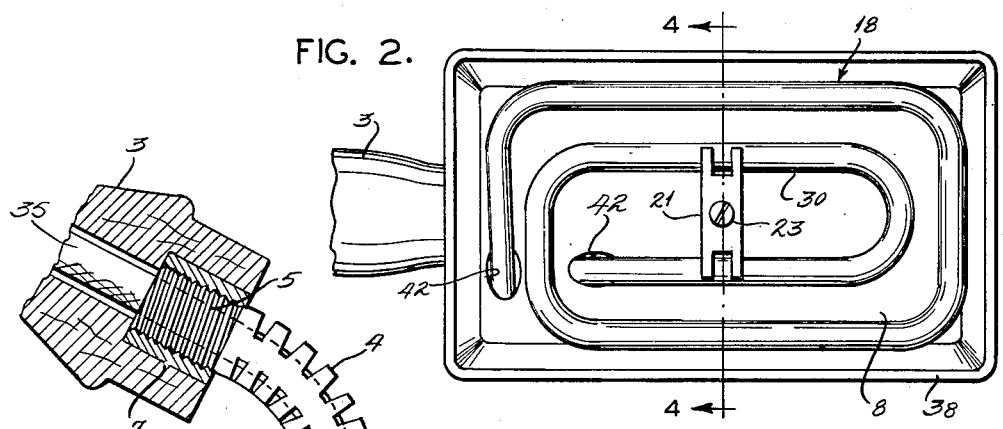
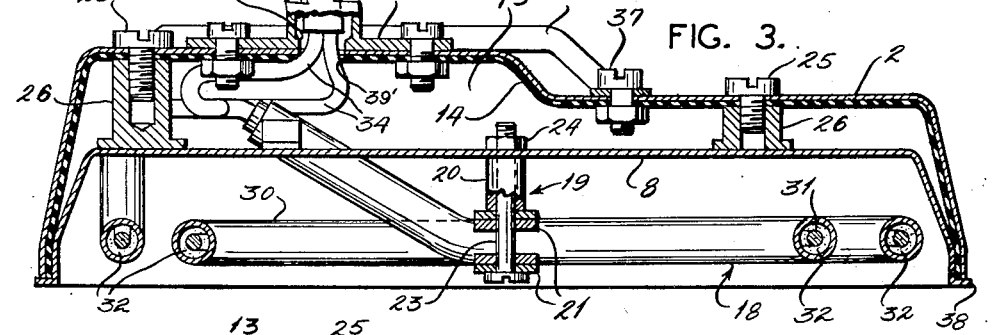
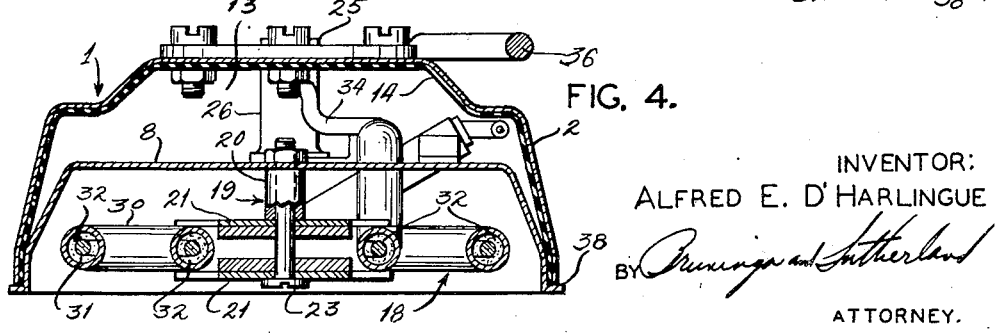
INVENTOR:
ALFRED E. D'HARLINGUE
BY Prunings and Sutherland
ATTORNEY.

Patented Mar. 17, 1953

2,632,087

UNITED STATES PATENT OFFICE 2,632,087

UTILITY BURNER

Alfred E. D'Harlingue, St. Louis, Mo., assignor to Julia-Ann Memorial Company, St. Louis, Mo., a firm Application September 28, 1950, Serial No. 187,167

7 Claims. (Cl. 219—29)

This invention relates to a portable electric utility burner. While this burner is principally for use in removing paint and varnish, it may also be used for many other purposes as, for example, in preparing asphalt tile blocks for laying by heating them to make them flexible and for removing damaged blocks without injury to adjacent blocks.

Paint removal from large areas has heretofore generally been accomplished by the use of blow torches. This procedure has many disadvantages among which are the danger of igniting the surface from which the paint is being removed, and the danger normally accompanying the use of inflammable liquids. Electric burners proposed heretofore have been provided with exposed resistance elements which have been subject to rapid deterioration by the fumes and paint particles to which they have been exposed, or with solid bottom plates which shield the work surface from direct radiation from the elements.

One of the objects of this invention is to provide an electric utility burner which is simple and sturdy, which subjects the surface to be heated to direct radiation from the heating elements, but the heating elements of which will not be incapacitated by contact with hot paint or fumes.

In accordance with an illustrative embodiment of this invention, an electric utility burner is provided having an outer shell, a reflector mounted on the outer shell, and a sheathed heating unit mounted on the reflector. The sheathed heating unit is positioned so as to be spaced above the surface of the work to be heated but the heat unit is not otherwise shielded from the surface of the work. A guard may be provided on the outer shell upon which the burner may be rested while hot, without damage to the surface upon which the burner is rested.

Referring now to the drawings:

Figure 1 is a plan view of one embodiment of this invention;

Figure 2 is a bottom plan view of the device shown in Figure 1;

Figure 3 is a sectional view taken along the line 3—3 of Figure 1; and

Figure 4 is a sectional view taken along the line 4—4 of Figure 2.

Referring now to the illustrative embodiment shown in the drawings, 1 represents the complete burner. The burner 1 is provided with an outer shell 2. A hollow handle 3, in the embodiment shown, is made of wood. The handle 3 is connected to the outer shell 2 by means of a stiff metal member 4 which, in the embodiment shown, is transversely slotted. The provision of these slots allows the member to be bent and also tends to insulate the handle from the heat of the outer shell. The slotted construction reduces the area of the conducting surfaces connecting the outer shell with the handle and increases the radiating surface of the metal member. Member 4 is threaded at its upper end 5, and provided at its lower end with a plate 6, bolted to the outer shell 2. A metal bushing 7, knurled or splined on its outer surface, is secured within the handle 3. The bushing 7 is internally threaded to receive the upper end 5 of the member 4. The slotted construction of the metal member 4 sufficiently reduces the heat transmitted to metal bushing 7 so that the bushing remains tightly within the wooden handle 3 with prolonged use.

A reflector 8 which may be stainless steel or the like is positioned within the outer shell 2. The reflector 8 is mounted within outer shell 2 by bolts 25 taking, through outer shell 2, into supporting columns 26 secured to the upper surface of reflector 8 in any suitable manner, as by welding, brazing, riveting or the like. The reflector 8 is separated about most of its area from the outer shell 2 by a space 13 which helps to insulate the outer shell, particularly in the region around the member 4. Insulation 14 is also provided between reflector 8 and outer shell 2. In the embodiment shown, reflector 8 is provided with an out-turned flange 38 extending around its lower edge.

Spaced intermediate the horizontal surface of the reflector and the lower edge of the reflector is a sheathed heating element 18. In the embodiment shown, the heating element 18 is held in position by a bracket 19. The bracket 19 comprises a pair of supporting clips 21 embracing a section of the heating element 18, a bolt 23 joining the clips 21, and a spacing sleeve 20 through which the bolt 23 extends. The bolt 23 also extends through the reflector 8 and the entire bracket is held in place by a nut 24.

The sheathed heating element 18 comprises an external tube 30 which may be made of stainless steel, Inconel or the like, and a central heating element 31 of a suitable high resistance wire, supported within the tube 30 by a suitable electrical insulating medium 32. Both ends of the sheathed heating element 18 extend through holes 42 in the reflector 8, into the space 13 between the reflector 8 and the outer shell 2.

The two ends of the central heating element 31 are attached to a pair of wires 34 extending from a cable 35 through a hole 39 in plate 6 and a corresponding hole 39' in outer shell 2. Cable 35 extends through metal member 4 and hollow handle 3.

A guard 36 is mounted on outer shell 2 by means of bolts 37. In the embodiment shown, the guard may also be used as a bracket for hanging the burner on a hook, as when it is being used on a ladder.

A switch, not here shown, may be provided either in connection with the handle 3 or along the cable 35.

In assembling this device, the guard 36 may be bolted to the outer shell 2. The plate 6 of member 4 is also bolted in place. The handle 3, with its pressed-in bushing 7, is screwed onto the threaded end 5 of the member 4. Cable 35 is stripped back to allow wires 34 to extend therefrom and is inserted through handle 3 and member 4 so that wires 34 extend through hole 39 in plate 6 and hole 39' in outer shell 2.

Supporting columns 26 are welded or otherwise secured to the upper side of reflector 8. Sheathed unit 18 is mounted by means of the bracket 19 within reflector 8 with the ends of the heating unit protruding through elongated holes 42 in the reflector.

The wires 34 are connected with the ends of the central heating element 31 by any suitable means. Reflector 8 is positioned within outer shell 2 with the out-turned flange 38 of the reflector 8 engaging the lower edge of the outer shell 2, and bolts 25 are tightened within supporting columns 26 to complete the assembly.

The step of applying insulation 14 depends upon the type of insulation which is used. If, for example, mica cloth is employed, the insulation may be applied to the under side of outer shell 2 even before the guard 36 and the plate 6 are mounted. On the other hand, if it is desired substantially to fill the space 13 with glass wool or the like, the insulation may be applied immediately before the reflector 8 is mounted within outer shell 2. A combination of various insulations may be used, when the assembly is carried out accordingly.

In operation, the burner may be used in any position. It can readily be seen that by incorporating a rheostat in the circuit, the amount of heat produced can be varied at will. Fumes and bits of paint or other materials coming in contact with the sheathed heating element will not seriously impair the life of the element. The element may thus be placed close to the surface to be treated, where the heating is most effective. The cable 35 need only be connected to a source of power which, depending upon the construction of the heating element, may be ordinary household 110 volt alternating current, 220 volt alternating current, or direct current. The speed with which the burner is passed over the surface to be heated depends upon the amount of heating desired and the temperature of the element. The burner may even be inverted and a section of tile or the like be placed on top thereof. The burner may be turned on its side so that it rests upon the guard 36 and the handle 3 without injuring the surface on which it rests even when the burner is hot.

While a single embodiment of this invention has been illustrated, it can be seen that numerous variations in construction are possible within the scope of the disclosure and the accompanying claims.

In the device of this invention, a simple, sturdy utility burner, easy to manufacture and use, and capable of numerous uses, is provided.

Having thus described the invention, what is claimed and desired to be secured by Letters Patent is:

1. A portable electric paint burner comprising an inner reflecting shell; an outer shell totally embracing said inner reflecting shell around the perimeter thereof but spaced from said inner reflecting shell along the top surface thereof; a double-ended sheathed heating element supported within said inner reflecting shell by a centrally located bracket depending from said inner shell, the two ends of said heating element extending through the said inner reflecting shell and into the space between said inner and outer shells; a flexible metal tube mounted on the outside of said outer shell; and lead wires, extending within said flexible metal tube and through said outer shell, and connected to the two ends of the heating element within the space between the inner and outer shells.

2. A portable electric paint burner comprising an inner reflecting shell; an outer shell totally embracing said inner shell around the perimeter thereof but spaced from said inner shell along the top surface thereof; a sheathed heating element supported within and from said inner shell; a handle mounted on said outer shell near the center line thereof; and a guard mounted on the upper surface of the outer shell above that area of said outer shell which is spaced from said inner reflecting shell, extending beyond and along an edge of said outer shell to provide a substantial supporting surface and to maintain said outer shell out of contact with a flat surface when the burner is rested on said handle and said guard.

3. A portable electric paint burner of the character described in claim 1 wherein the flexible metal tube is chordally slotted on its upper and under sides.

4. A portable electric paint burner of the character described in claim 1 wherein the sheathed heating element is positioned closer to the open bottom of the inner reflecting shell than it is to the overhead reflecting surface of said inner reflecting shell.

5. A portable electric paint burner comprising an inner reflecting shell; an outer shell totally embracing said inner reflecting shell around the perimeter thereof but spaced from said inner reflecting shell along the top surface thereof; a double-ended sheathed heating element supported within said inner reflecting shell, the two sheathed ends of said heating element extending through the said inner reflecting shell and into the space between said inner and outer shells; a metal tube mounted on the outside of said outer shell and forming a handle part; and lead wires, extending within said metal tube and through said outer shell, and connected to the two ends of the heating element within the space between the inner and outer shells.

6. A portable electric paint burner of the character described in claim 5 wherein the metal tube is chordally slotted on its upper and under sides.

7. A portable electric paint burner of the character described in claim 5 wherein the sheathed heating element is positioned closer to the open bottom of the inner reflecting shell than it is to the overhead reflecting surface of said inner reflecting shell.

ALFRED E. D'HARLINGUE.

(References on following page)

REFERENCES CITED

The following references are of record in the file of this patent:

UNITED STATES PATENTS

| Number | Name | Date |
|---|---|---|
| 1,359,400 | Lightfoot | Nov. 16, 1920 |
| 1,528,948 | Pruden | Mar. 10, 1925 |
| 1,835,602 | Kercher et al. | Dec. 8, 1931 |
| 1,998,330 | Nicholson et al. | Apr. 16, 1935 |
| 2,038,555 | Eidschun | Apr. 28, 1936 |
| 2,109,022 | Daniels | Feb. 22, 1938 |
| 2,223,331 | Roesch et al. | Nov. 26, 1940 |
| 2,413,477 | Wiegand | Dec. 31, 1946 |
| 2,434,244 | Johnson | Jan. 13, 1948 |
| 2,588,185 | Walter | Mar. 4, 1952 |

FOREIGN PATENTS

| Number | Country | Date |
|---|---|---|
| 615,392 | Great Britain | Jan. 5, 1949 |
| 762,558 | France | Apr. 13, 1934 |